United States Patent [19]

Dohlen et al.

[11] Patent Number: 4,573,628

[45] Date of Patent: Mar. 4, 1986

[54] METHOD FOR TAPPING INTO TUBING UNDER A CONTROLLED ATMOSPHERE, IN PARTICULAR FOR TUBING IN A NUCLEAR POWER STATION

[75] Inventors: Gérard Dohlen, Ecuelle; Jean-Claude Le Marquis, Moret; Claude Oberlin, Avon, all of France

[73] Assignee: Electricite de France, Paris, France

[21] Appl. No.: 591,405

[22] Filed: Mar. 20, 1984

[30] Foreign Application Priority Data

Mar. 24, 1983 [FR] France ............... 83 04838

[51] Int. Cl.⁴ ............................................. F16K 43/00
[52] U.S. Cl. ................... 228/170; 228/219; 138/92; 138/94; 137/318; 137/15
[58] Field of Search ............... 228/219, 119, 176, 170; 138/92, 94; 137/317, 318, 15; 251/146; 285/197–199

[56] References Cited

U.S. PATENT DOCUMENTS

| | | | |
|---|---|---|---|
| 2,050,985 | 8/1936 | Trickey | 137/15 |
| 3,272,211 | 9/1966 | Leopold, Jr. et al. | 137/15 |
| 3,335,742 | 8/1967 | Novak | 137/318 |
| 3,585,699 | 6/1971 | Shuttle | 29/157 R |
| 3,734,112 | 5/1973 | Finney et al. | 137/15 |
| 4,234,006 | 11/1980 | Cookson | 137/15 |

FOREIGN PATENT DOCUMENTS 184106 8/1922 United Kingdom .

Primary Examiner—Nicholas P. Godici
Assistant Examiner—Kenneth F. Berg
Attorney, Agent, or Firm—McCormick, Paulding & Huber

[57] ABSTRACT

The method comprises the steps of: digging out a continuous groove (13) in the wall of the tubing at the location of the tapping point to be made, said groove being slightly shallower than the thickness of the wall, thereby leaving a membrane (14) of metal at the bottom of the groove between the inside of the tubing and the outside atmosphere; placing a sealed isolation unit on the tubing, said unit covering a wide area which is at least equal to the area delimited by the groove; breaking the metal membrane so as to make an opening in the wall of the tubing; removing the cut out portion of the wall; welding on a blind tail pipe; and removing the sealed isolation unit. The invention also provides a groove-digging device, and a membrane-breaking punch device (600).

5 Claims, 21 Drawing Figures

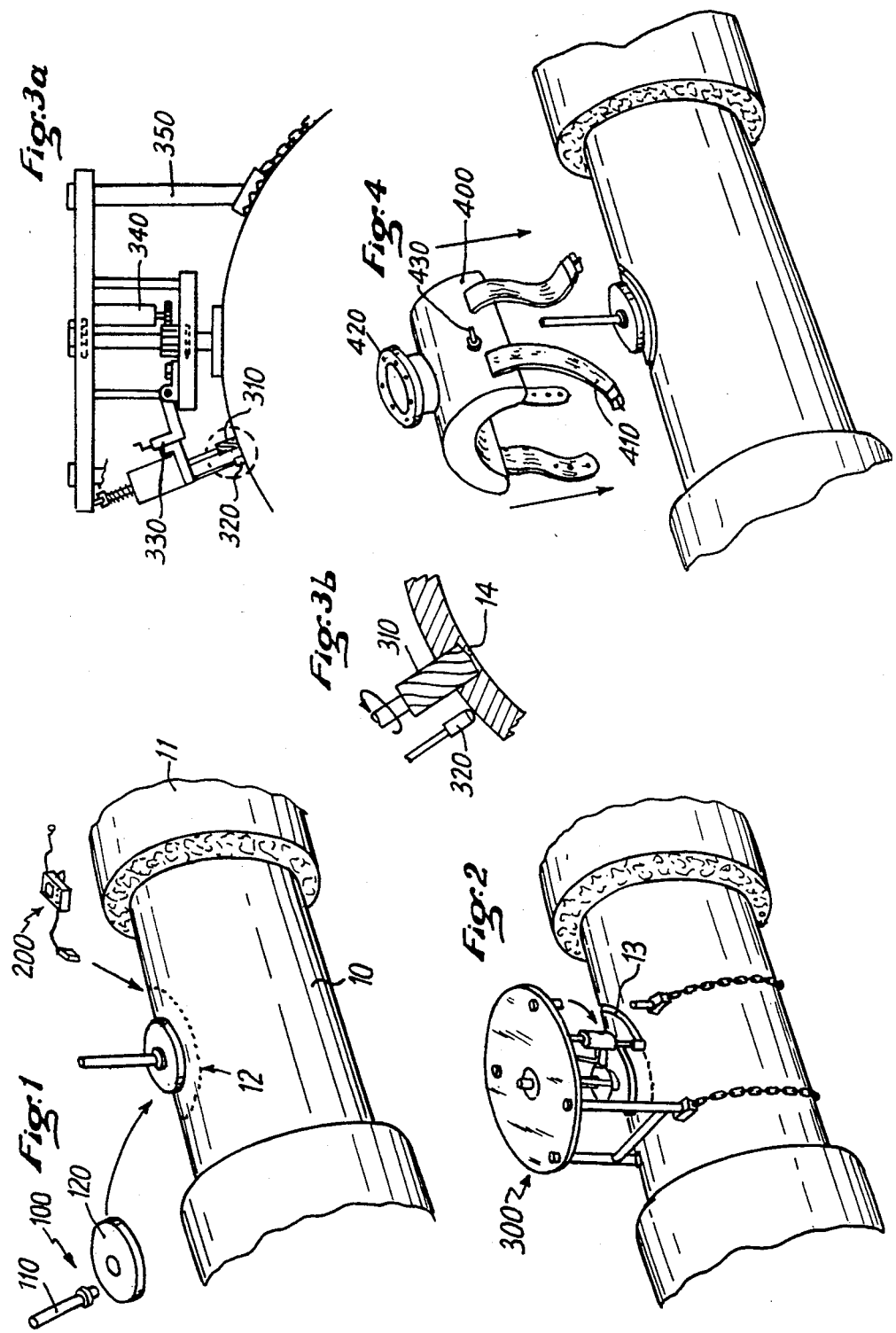

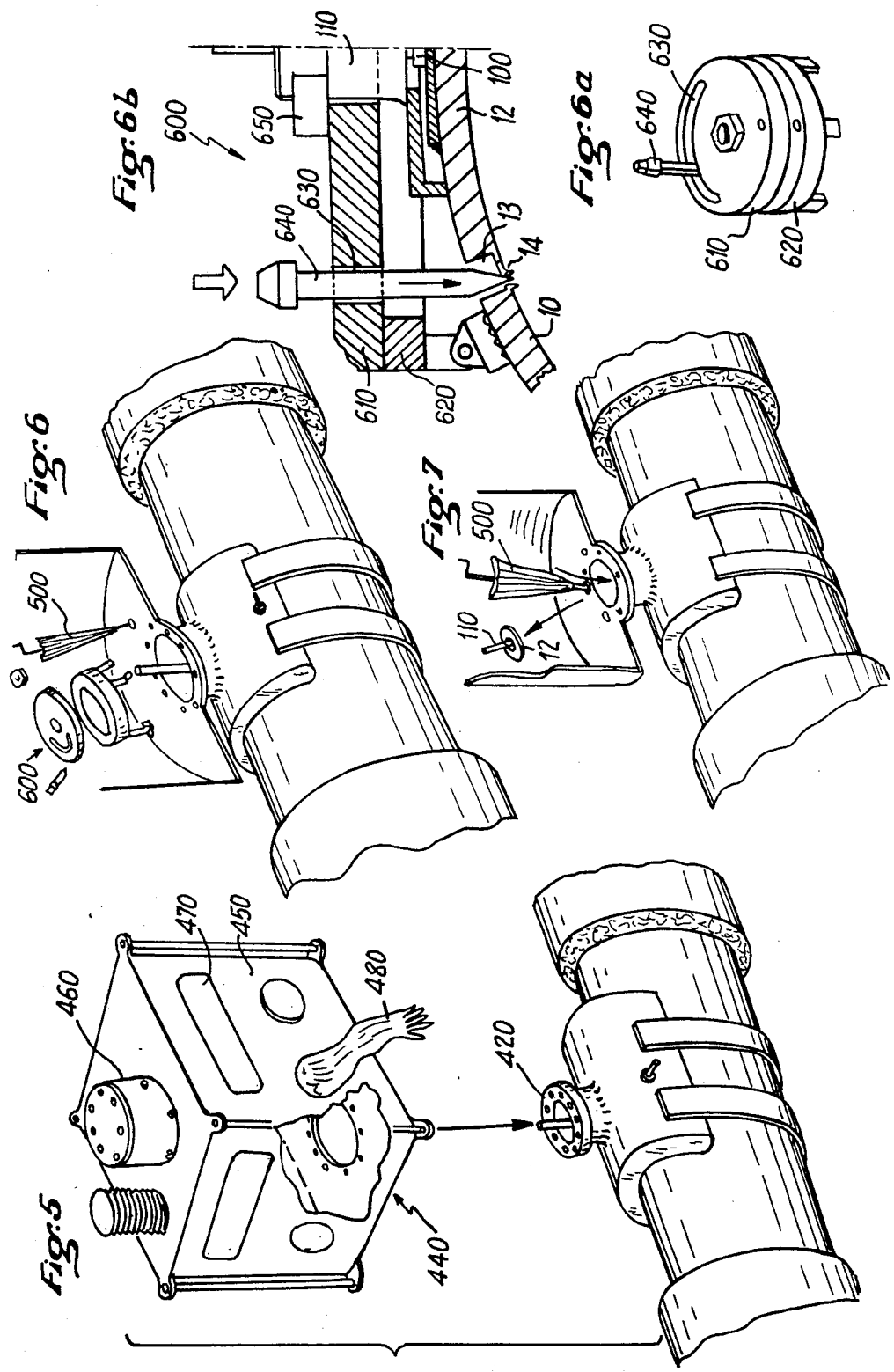

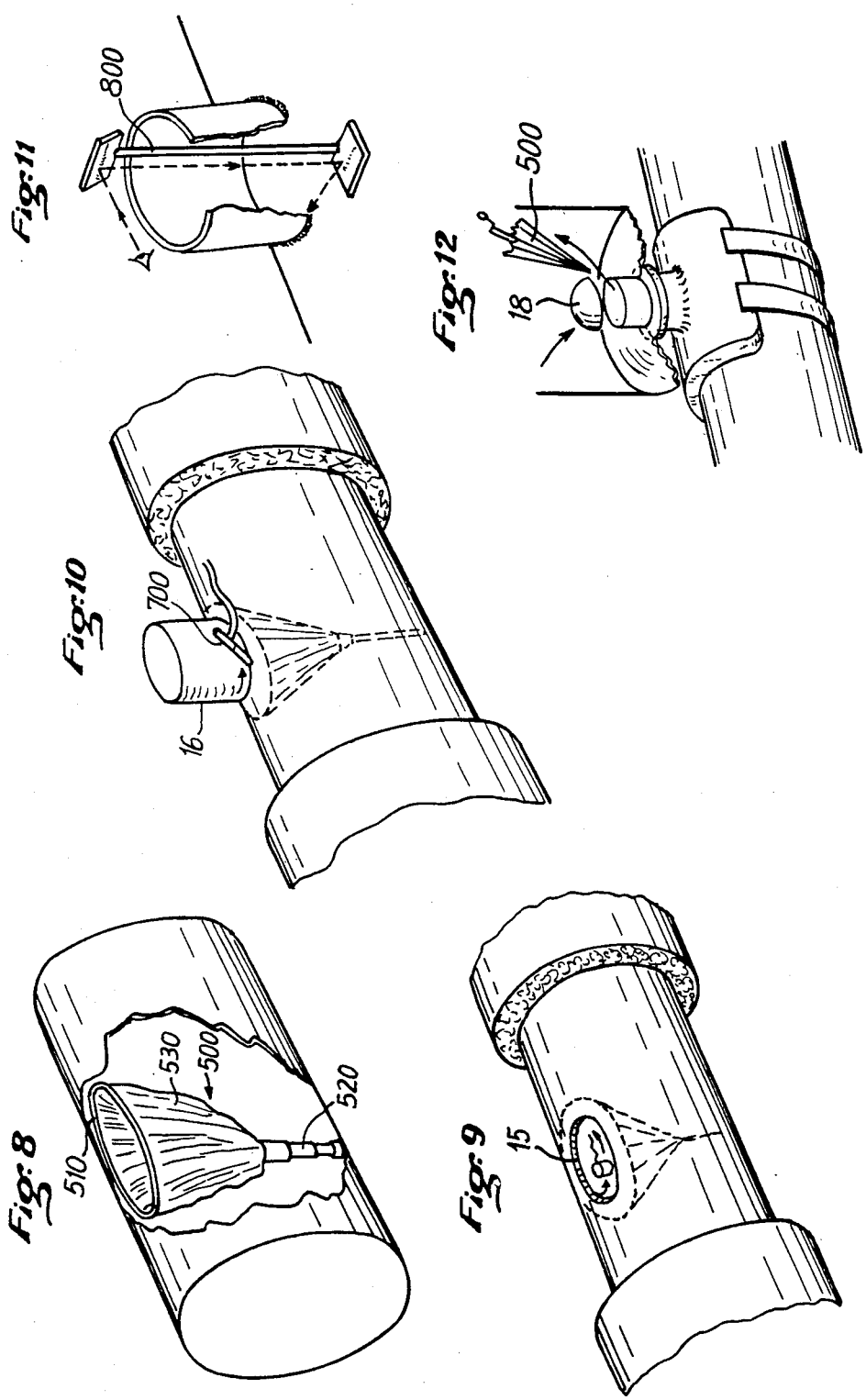

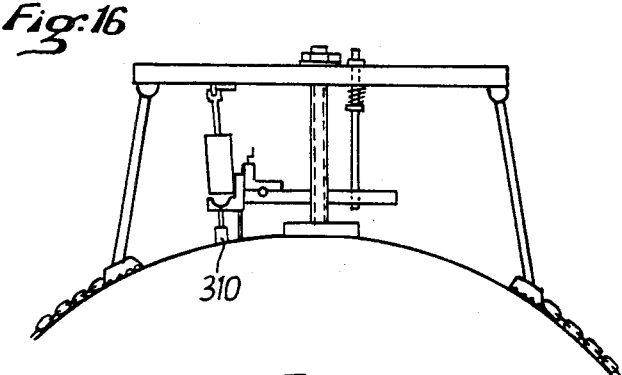
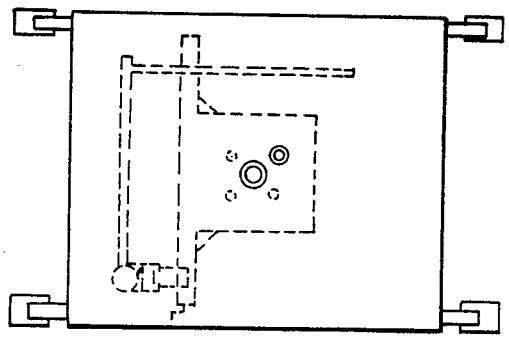
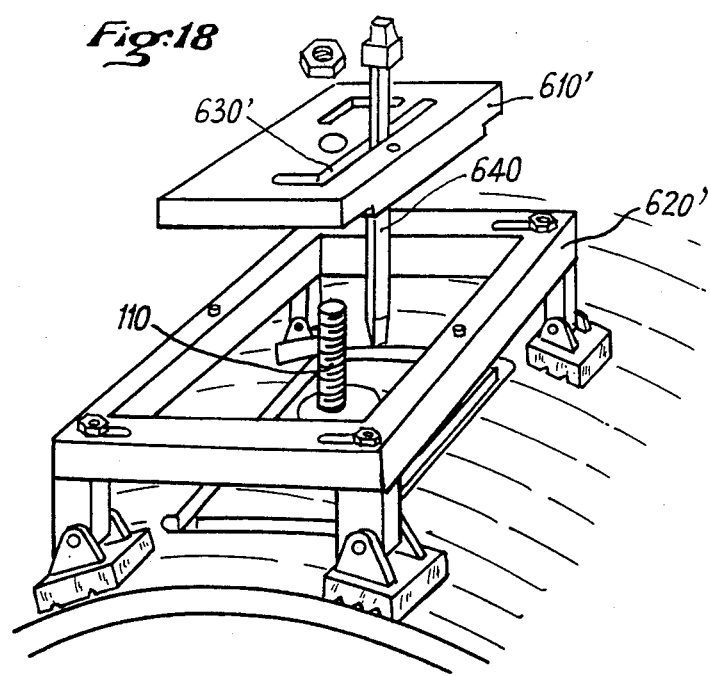

METHOD FOR TAPPING INTO TUBING UNDER A CONTROLLED ATMOSPHERE, IN PARTICULAR FOR TUBING IN A NUCLEAR POWER STATION

The present invention relates to a method of making a tapping point under a controlled atmosphere into tubing, and in particular tubing in a nuclear power station. The invention also relates to apparatus for implementing the method.

BACKGROUND OF THE INVENTION

The term "tapping" is used to mean making an access point through the side of the tubing via a short, blind, tail-pipe (which may be of circular or rectangular section) of much smaller diameter and oriented perpendicularly to the axis of the tubing. The access point through the side is used when working on the tubing. The tapping point is opened by taking a cover off the tail-pipe, thus enabling all sorts of devices to be passed into the tubing for maintenance and repairs (in particular, flexible baloon plugs may be inserted and inflated inside the tubing to seal the circuit from the outside world) or for inspecting tubing integrity (in particular by gamma radiography).

Up to now, such tapping points have been provided at appropriate locations at the design stage, and they have been made during initial construction of the installation. Providing an additional tapping point in preexisting tubing has required major work of long duration in which the portion of the installation to be modified is isolated, emptied, cooled, and disassembled.

Preferred implementations of the invention enable such tapping points to be made without requiring the installation to be closed down for a long period of time, in particular by keeping the circuit under a controlled atmosphere of inert gas (eg. argon) before, during, and after the operation, and by working on the tubing while it is still hot, ie. at temperatures of up to 180° C.

These properties make it possible, in particular, to take action quickly on the sodium circuits in a nuclear power station, which action used to be impossible, once the installation had been put into operation, and without a major undertaking.

SUMMARY OF THE INVENTION

The method according to the invention comprises the steps of:

digging out a continuous groove in the wall of the tubing at the location of the tapping point to be made, said groove being slightly shallower than the thickness of the wall, thereby leaving a membrane of metal at the bottom of the groove between the inside of the tubing and the outside atmosphere;

placing a sealed isolation unit such as a glove box on the tubing, said unit covering a wide area which is at least equal to the area delimited by the groove;

breaking the membrane of metal so as to make an opening in the wall of the tubing;

removing the cut out portion of the wall;

welding on a blind tail-pipe; and removing the sealed isolation unit.

Preferably the blind tail-pipe tapping point is welded on by welding on a tubular sleeve and then closing the sleeve by welding on a cover.

Preferably, once the metal membrane has been broken, a device for retaining machining debris is inserted and deployed inside the tubing, said device being folded and removed before the tubular sleeve is closed.

The debris-retaining device may also be provided for defining a work zone in the vicinity of the opening and partially inside the tubing, and for isolating said zone in a sealed manner. In which case, the sealed isolation unit may advantageously be removed during all of the operations which are performed while the debris-retaining device is in place.

For digging out the groove, the invention also provides a groove-cutting device which comprises:

a cutter tool suitable for digging out a groove at the location of a tapping point to be made;

means for adjusting the depth of the cutter tool;

feeler means suitable for following the surface of the tubing in the vicinity of the cutter tool and for co-operating with the preceding means in such a manner as to adjust the cutting depth to slightly less than the thickness of the wall to leave a membrane of metal of constant thickness at the bottom of the groove; and means for moving the cutter tool along a predetermined path corresponding to the required cutting.

The invention also provides a membrane-breaking punch device comprising:

a support which is fully supported on the zone of the tubing wall which lies outside the zone defined by the groove;

a punch template placed on the support and having a guide slot placed above the groove and immediately opposite the groove; and a punch which is guided by the slot in the template.

Advantageously, the groove-cutting device and the punch device are guided or supported by a tool-centering device which is previously welded to the center of the zone on the tubing wall through which the tapping point is to be made. This tool-containing device also serves to hold the cut-out portion of the wall when the membrane is broken, thus preventing it from falling inside the tubing.

BRIEF DESCRIPTION OF THE DRAWINGS

Implementations of the invention are described by way of example with reference to the accompanying drawings, in which:

FIG. 1 shows a step prior to welding on the tool support;

FIG. 2 shows the groove-digging step;

FIGS. 3a and 3b show an example of a machine for digging out the groove and suitable for implementing this step of the method;

FIGS. 4 and 5 show a glove box constituting a sealed isolation unit being put into place;

FIG. 6 shows the membrane-breaking punch being put in place, said punch being shown in greater detail in FIGS. 6a and 6b;

FIG. 7 shows the broken off piece being removed and the debris-retaining device being inserted;

FIG. 8 shows the debris-retaining device deployed inside the tubing;

FIG. 9 shows a chamfer being made for welding to the tapping tail-pipe;

FIG. 10 shows the tail-pipe being welded on;

FIG. 11 shows how the inside of the weld can be visually inspected;

FIG. 12 shows the final steps, with the glove-box back in place, of removing the debris-retaining device and of welding on a tapping-point-closing cap;

FIGS. 16 and 17 are an end view and a plan view respectively of a machine for digging out a groove for a tapping point of rectangular cross section; and FIG. 18 is a perspective view of a punch device for punching out such a rectangular opening.

MORE DETAILED DESCRIPTION

Figure 13:
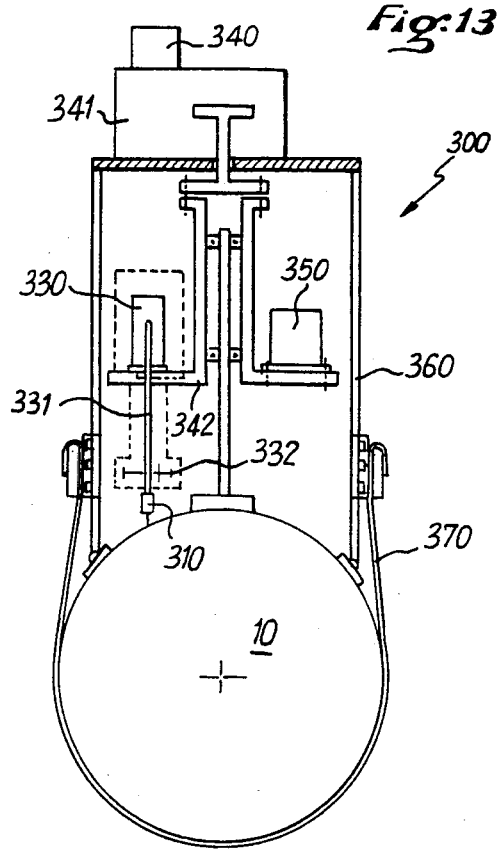
FIG. 13 shows a detail of an embodiment of a machine for digging out the groove to make a circular opening.

FIG. 1 shows a portion of tubing 10 from which thermal insulation 11 has been stripped. In normal operation, the insulation thermally protects the fluid flow circuits overall. The zone in which a tapping point is to be made is referenced 12.

A tool-support 100 is welded substantially to the middle of this zone. The tool-support comprises, for example, a rod 110 screwed to the center of a plate 120 for welding to the wall of the tubing.

An operator uses an ultrasonic instrument 200 for measuring the thickness of the tubing in the zone to be cut out.

The groove-cutting machine 300 can then be put in place and supported by the rod 110. The machine is adjusted to cut out a groove 13 of such a depth as to leave a membrane of metal 14 (see FIG. 3b) which is a few tenths of a millimeter thick.

FIG. 3a (and a detail shown on a larger scale in FIG. 3b) shows the structure of this machine in diagrammatic form: it includes a cutter tool 310, eg. comprising a cylindrical head, for cutting out a groove. It is provided with means 330 for adjusting the depth of the head, the position of the surface of the tubing being determined by a feeler 320. It is thus possible to follow the surface of the tubing adjacent to the cutter head 310 round the entire path of the groove, even though the profile of the groove is not flat (in the present case of a circular tapping pipe, it follows the line of intersection of two cylinders). Means 340 are also provided for moving the cutter tool along a pre-established path corresponding to the desired cut, eg. a path which is circular in plan view.

Once the groove has been completed, the operator removes the cutting machine and places a hermetic isolation unit on the tubing for isolating the opening, once it has been made, from the outside atmosphere. The isolation unit may be constituted by a glove-box, for example, enabling the operator to work freely while ensuring isolation. The glove-box may, for example, be fixed to an inflatable base 400 (see FIG. 4) which matches the outside shape of the tubing and which is fixed thereto by girth straps 410. The base has a circular flange 420 for fixing to the glove-box. The base is preferably an inflatable sealing member which is inflated by pumping in gas under pressure through a valve 430.

The glove-box per se 440 (see FIG. 5) is then fixed in a sealed manner to the flange 420. The glove box may be in the form of a rectangular or cylindrical chamber 450 made of reinforced elastomer and provided with an air-lock for inserting tools, with port-holes 470, and with operator gloves 480.

The debris-retaining device 500 and the membrane-breaking punch 600 are inserted into the glove-box (FIG. 6).

The debris-retaining device is, for example, as described in the Applicants' French application No. 83 04 437 filed Mar. 24, 1983. Once deployed inside the tubing under the orifice, the device described in that application not only recovers swarf and other debris caused by machining operations on said opening, but also seals the inside of the tubing from the outside atmosphere. It is thus possible to perform all operations on the open orifice in the tubing in the open air, including welding from both sides.

The orifice is opened by the punch device 600 shown in FIGS. 6a and 6b: the punch device is supported and guided by the support 100, and includes a punch template 610 placed on a support 620 which is completely supported on the zone of the tubing wall lying outside the zone defined by the groove. The template has a guide slot 630 opposite the groove for guiding a punch per se 640. In the example shown, the opening is circular, so the slot 630 extends over a fraction of a circle, and the operator rotates the template as different portions of the circumference are progressively punched through.

Since the membrane remaining at the bottom of the groove is thin, it can be punched through without pieces dropping off (ie. without foreign bodies getting into the tubing) and without deforming the metal wall of the tubing.

Once the groove has been completely punched through, the cut-out central fraction of the wall is retained by the tool support rod 110. The rod remains connected to the support 620 of the punch device by means of a nut 650. This prevents the cut-out portion from dropping to the bottom of the tubing after it has been punched out.

The operator removes this fraction 12 by means of the rod 110 while dismantling the punch device, and then inserts the debris-retaining device 500 into the tubing through the opening.

FIG. 8 shows this device deployed inside the tubing: an inflatable seal 510 is pressed against the inside of the tubing around the orifice by means of a telescopic leg 520 in order to fix a flexible sheet 530 in a sealed manner so that it retains debris and also isolates the inside of the tubing, which may be maintained under a controlled atmosphere of inert gas.

A chamfer 15 is then made around the orifice (FIG. 9) so as to enable a tubular sleeve 16 to be welded thereto by means of a torch 700 in conventional manner.

The inside surface of the weld is observed by means of a mirror apparatus 800 (FIG. 11) and is then inspected by gamma radiography.

The glove box is then put back in place, the debris-retaining device 500 is removed, and the end of the sleeve is closed by welding on a cap 18. This weld is preferably done without any added filler metal, using a refractory electrode arc welding apparatus (TIG welding).

The glove-box is then removed and the thermal insulation is replaced.

FIG. 13 shows a variant machine for digging out the groove. The opening is still circular, and the cutter tool 310 is supported by a rod 331 which is preferably of square section to prevent axial rotation. The tool is lowered by a vernier 332 so that it just touches the surface of the tubing. An actuator 330, eg. a two-body actuator providing a small driving force but great accuracy, then lowers the tool to the required depth. A coder 350 transmits depth data to the actuator.

A motor 340 associated with a step-down gear-box 341 drives the tool support 342 so that the tool follows the predetermined path.

The entire machine assembly may be supported by a frame 360 which is fixed to the tubing by girth traps 370.

Figure 14:
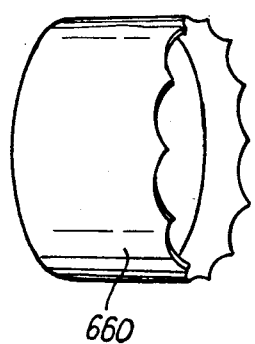
FIGS. 14 and 15 show a variant of the punch device for use with a circular opening.
Figure 15:
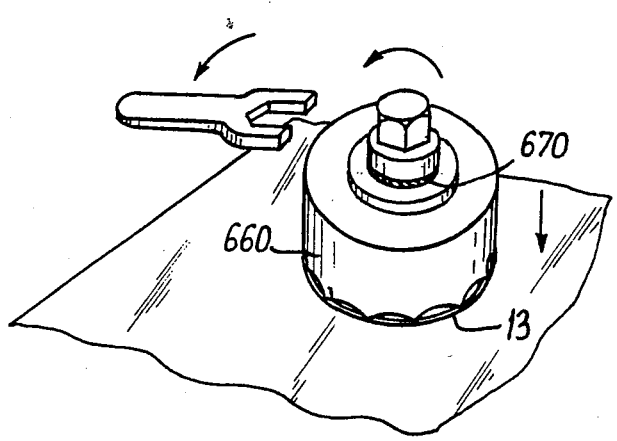

FIGS. 14 and 15 show a second type of punch device for a circular opening. This tool comprises scalloped-edged cylindrical punch 660 which is movably mounted around the rod 110 welded to the center of the zone to be cut out by means of a ball-bearing stop 670, for example. The operator then places the cylindrical punch in the groove 13 and punches through the membrane by lightly striking the punch. Pieces of membrane do not fall off. The striking may be mechanized by a vibrator system.

FIGS. 16 to 18 show a hole being cut out which is rectangular in plan rather than circular. FIGS. 16 and 17 show a variant cutter machine. Since the groove comprises two rectilinear portions and two portions in the shape of circular arcs, the inclination of the tool 310 relative to the surface of the tubing remains constant, which facilitates guidance while moving round the path of the groove.

FIG. 18 shows a punch device for a rectangular cutout. The punch device is analogous to that shown in FIGS. 6a and 6b for a circular groove. The present device includes a template 610' which is placed on a support 620'. A slot 630' of rectangular profile guides the punch 640. The tool support rod 110 serves to center the various parts as before.

We claim:

1. A method of making a tapping point into tubing under a controlled atmosphere, in particular into tubing in a nuclear power station, wherein the method comprises the steps of:
    digging out a continuous groove in the wall of the tubing at the location of the tapping point to be made, said groove being slightly shallower than the thickness of the wall, thereby leaving a membrane of metal at the bottom of the groove between the inside of the tubing and the outside atmosphere;
    placing a sealed isolation unit on the tubing, said unit covering a wide area which is at least equal to the area delimited by the groove;
    breaking the metal membrane so as to make an opening in the wall of the tubing;
    removing the cut out portion of the wall;
    welding on a blind tail-pipe; and
    removing the sealed isolation unit.

2. A method according to claim 1, wherein the blind tail-pipe tapping point is welded on by:
    welding on a tubular sleeve, and;
    closing the sleeve by welding on a cover.

3. A method according to claim 2, further including the following steps:
    after the metal membrane has been broken, a device for retaining machining debris is inserted and deployed inside the tubing;
    before the tubular sleeve is closed, said device is folded and removed.

4. A method according to claim 3, wherein the sealed isolation unit is removed during operations performed while the debris-retaining device is in place, said device being additionally suitable for defining a work zone in the vicinity of the opening and partially inside the tubing, and for isolating said zone in a sealed manner.

5. A method according to claim 1, further including a prior step of welding a support to the center of the zone in which the opening is to be made, said support serving to center tools and to grasp the cut-out fraction of the wall.

* * * * *